United States Patent [19]

Demesy et al.

[11] Patent Number: 5,084,827
[45] Date of Patent: Jan. 28, 1992

[54] SYSTEM FOR MEASURING THE POSITION OF A TOOL HAVING A NOSE ON A MACHINE TOOL

[75] Inventors: Michel Demesy, Fontaine les Dijon; Marcel Boulet, Vardis et Chaignot; Gérard Clair; Jean-Louis Ponsot, both of Dijon, all of France

[73] Assignee: Commissariat a l'Energie Atomique, France

[21] Appl. No.: 452,775

[22] Filed: Dec. 19, 1989

[30] Foreign Application Priority Data

Dec. 23, 1988 [FR] France .................. 88 17114

[51] Int. Cl.$^5$ .............................. B23B 25/06
[52] U.S. Cl. ................... 364/474.37; 364/474.34; 356/243
[58] Field of Search ........... 364/474.34, 474.37; 356/375, 243; 250/201.1, 221, 561; 82/118, 152, 11, 12

[56] References Cited

U.S. PATENT DOCUMENTS

| 2,249,121 | 7/1941 | Drescher | 29/57 |
| 3,738,204 | 6/1973 | Spriggs | 82/12 |
| 4,018,113 | 4/1977 | Blazenin | 82/118 |
| 4,329,785 | 5/1982 | Peterson | 33/628 |
| 4,656,896 | 4/1987 | Bietz et al. | 356/153 |
| 4,667,113 | 5/1987 | Nakajima et al. | 250/561 |

FOREIGN PATENT DOCUMENTS

| 2302817 | 2/1976 | France . |
| 2580534 | 4/1985 | France . |
| 2593103 | 1/1986 | France . |

Primary Examiner—Jerry Smith
Assistant Examiner—Paul Gordon
Attorney, Agent, or Firm—Hayes, Soloway, Hennessey & Hage

[57] ABSTRACT

A system for the reference marking of the position of a machine tool relative to the machine. Use is made of a camera, which compares two perpendicular images of a standard having a known position with corresponding images, whcih are then displayed, of the tool. No dismantling of the tool or the tool holder turret is required. A particular application is to turning and numerically controlled machines.

8 Claims, 4 Drawing Sheets

SYSTEM FOR MEASURING THE POSITION OF A TOOL HAVING A NOSE ON A MACHINE TOOL

BACKGROUND OF THE INVENTION

1. Field of the Invention

The present invention relates to a system for measuring the position of a tool having a nose or point on a machine tool, which is particularly numerically controlled.

It is necessary to know the gauges of the tool with respect to the gauges of a part to be machined in order to bring about precise machining. In the case of a tool provided with a cutting edge nose, such as a turning or lathe tool, it is necessary to have not only the position of the support of the tool with respect to the support of the part, but also the shape of the tool nose, which varies with wear.

The shape of the tool nose or point is conventionally measured by means of a profile projector, which illuminates it and gives a magnified image thereof on the screen. However, it is necessary to dismantle the tool, which makes it impossible to carry out such a check between two machining passes, particularly for detecting supplementary wear to the tool, because all the gauges of the tool would then be lost.

Moreover, tool gauging is carried out on a separate presetting bench, which consequently makes it necessary to dismantle the tool holder from the machine tool and only permits the reinstallation thereof with an imprecision incompatible with precise machining.

The object of the invention is to overcome these imprecisions by using a system entirely mounted on the machine and involving no dismantling or disassembly of the tool or tool holder.

2. Description of the Related Art

An earlier-dated patent of the Commissariat a l'Energie Atomique (FR-A-2 580 537) makes is possible to gauge a lathe tool without disassembling it and by using an image of said tool on a screen provided with the fixed line of a reticule or graticule serving as the origin. The main settings consist of bringing the tool centre onto a vertical centre height axis ZZ' by adjusting the position of the tool holder on a turret rotating about the centre height axis and placing the turret at a predetermined angular position in order to bring the tool edge tangential to the machining direction XX'. For this purpose use is made of a standard fixed to the chuck of the lathe, whose centre displacement supplies an angular reference. A supplementary setting consists of setting the centre height of the tool with the aid of an image perpendicular to the previous one.

However, this earlier-dated invention requires two separate illuminating and photographing optical systems, which leads to a greater complication of the installation. Moreover, the standard is not integral with the tool and consequently the turret can only carry a single tool. The invention makes it possible to evaluate the coordinates of the centres of a plurality of tools with respect to a single standard rather than correcting the position and orientation of a tool centre with respect to the lathe frame.

SUMMARY OF THE INVENTION

The position measuring system according to the invention can be used for a tool with a displaceable point in a machining direction and in an advance direction and which occupies a fixed position in a centre height direction. It comprises a camera located on a displaceable support rotating about an axis in the machining direction in order to enable the camera to occupy two positions, where it is directed in the advance direction and the centre height direction respectively. The camera is connected to a display means provided with reference marking means for comparing successive images of the tool and a standard fixed to the machine. The reference marking means can be a mobile square grid produced automatically on a screen. Moreover, for certain applications, the camera support rotates in order to enable the camera to occupy a position in the tool advance direction, but in the reverse direction of that previously defined, where the camera is directed in the same direction.

The invention is described in greater detail hereinafter relative to a non-limitative embodiment and the attached drawings.

DESCRIPTION OF THE PREFERRED EMBODIMENT

Figure 1:
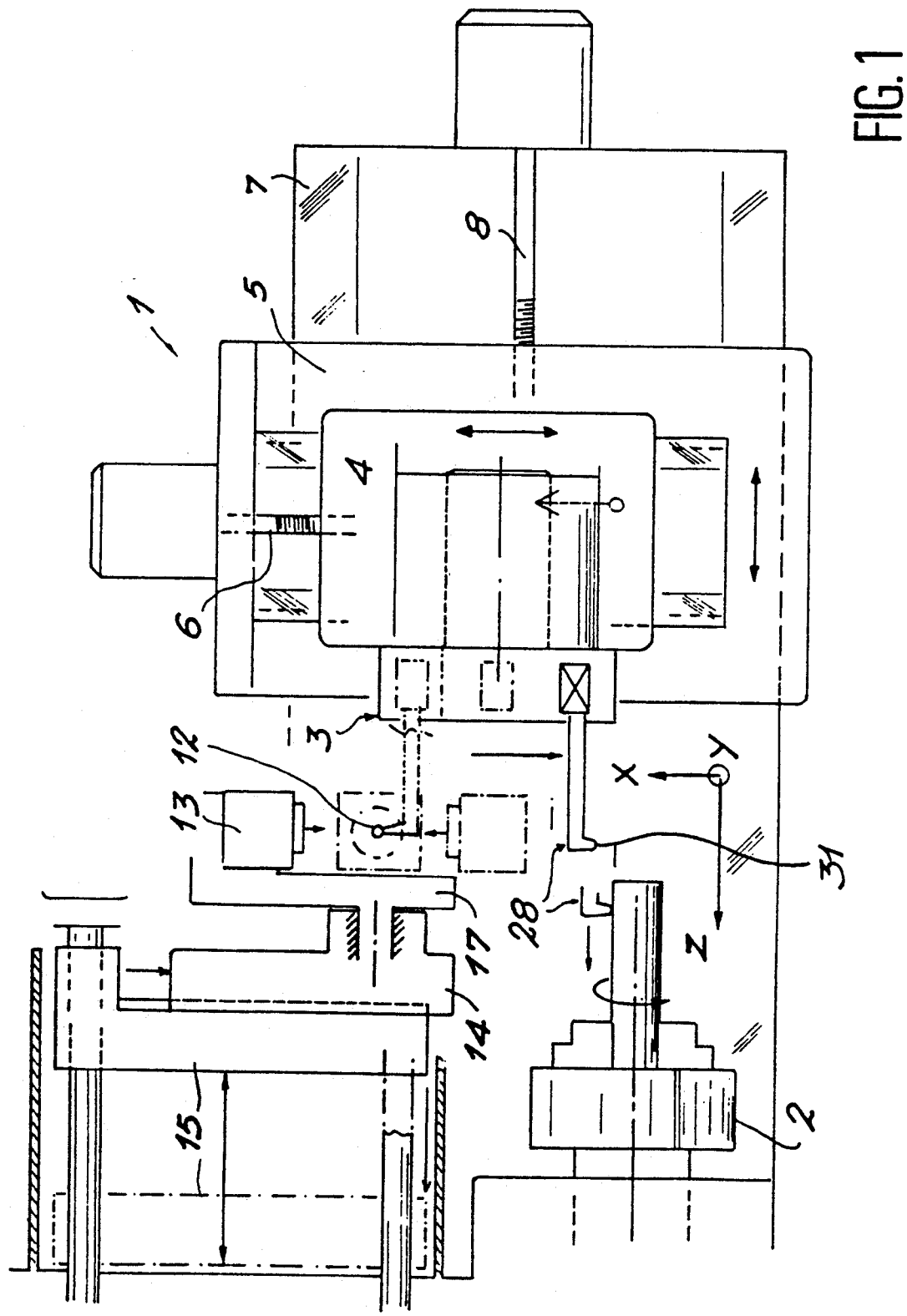
FIG. 1 A front view of a machine tool equipped with the system according to the invention.
Figure 2:
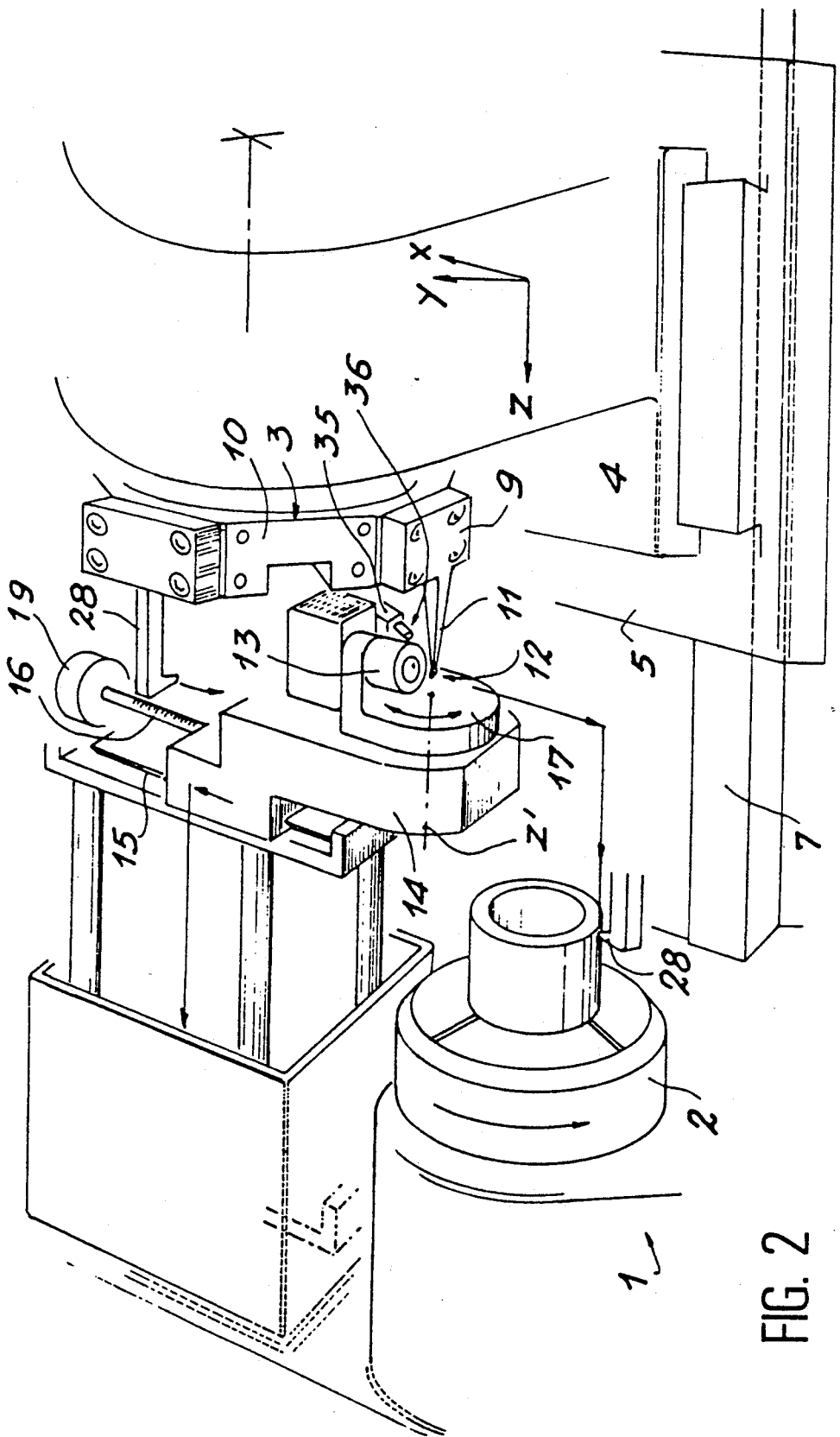
FIG. 2 A larger scale partial view showing the essential components of the invention.
Figure 3:
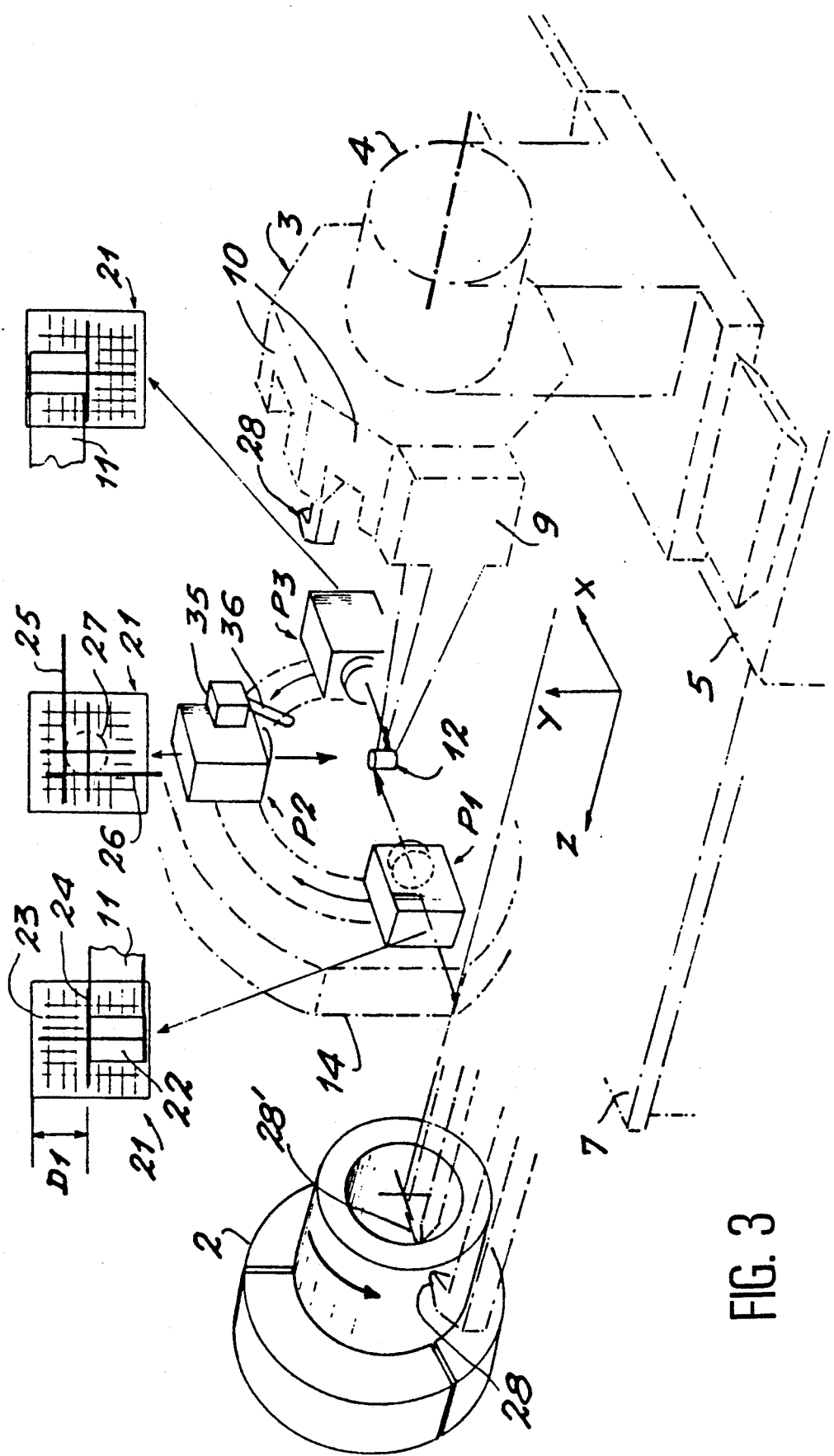
FIG. 3 A general diagram explaining the measurements.

FIGS. 1 and 2 show a numerically controlled lathe 1 provided with a chuck 2 for gripping the part to be turned and a tool holder 3, which is in this case an octagonal drum and which consequently makes it possible to machine with several tools without disassembly. The tool holder 3 is dependent on a turret 4 on which it is rotatable by eighths of a turn and the turret is dependent on a carriage 5 with respect to which it moves in an advance direction X perpendicular to the rotation direction of the chuck 2 by means of a power feed screw 6. The carriage 5 is connected to frame 7 via a second Archimedean screw 8 parallel to the rotation axis of chuck 2, so that carriage 5 can be moved in a machining direction Z. However, the tool holder 3 is stationary with resepct to a third direction perpendicular to the first two directions and called the centre height direction Y. The centre height can be defined as the minimum distance of a machining tool 28 from the rotation axis of chuck 2 when the turret 4 moves in the advance direction X.

A standard 9 is fixed to one of the facets 10 of the tool holder 3 (FIG. 2). The function of standard 9 is to supply a reference frame and can therefore assume very varied forms, but is advantageously similar to a real tool. It advantageously has a constant width 11 in the centre height direction Y and a nose 12 having a rounded end profile on looking at it in the same centre height direction Y.

A camera 13 is located in the vicinity of standard 9, being fixed to a support 14 displaceable in the advance direction X relative to frame 7 by sliding on a slide 15 and control by a recirculating ball screw 16. The camera 13 is fixed to a rotary turret 17, which can turn relative to support 14 about an axis Z' parallel to the machining direction Z, in order to occupy three positions, namely a position for which the camera 13 is oriented in advance direction X, a second position perpendicular to the first and where the camera is oriented in the centre height direction Y and a third position in which the camera 13 is still oriented in advance direction X, but in the opposite direction to that of the first position.

The installation also comprises a stepping motor 19, which rotates the recirculating ball screw 16 and a video screen 21 connected to camera 13. All these means are controlled by a computer.

A photoemitter 35 extended by an optical fibre 36 illuminates the space just in front of the lens of camera 13.

The measurements of the gauges of tool 28 (FIGS. 3 to 6) consist of photographing the tool 28 in two perpendicular directions and which are compared with photographs of standard 9 taken under the same conditions.

The front image or photograph of standard 9 taken by the camera 13 oriented in the first or third positions (P1 or P3 in FIG. 3) is a rectangle 22, whereof the position of a lateral side 24 with respect to the edge of the screen 21 (distance D1) makes it possible to obtain the centre height of standard 9. This can be helped by a square grid 23 produced on screen 21 by the control computer. Camera 13 is then turned round, brought into the second position P2 and a profile view of standard 9 is obtained.

Displacement then takes place of the lines of the square grid 23 in such a way that two perpendicular lines 25 and 26 thereof are tangential to the rounded profile image 27 of nose 12.

Support 14 is then withdrawn by a controlled rotation of motor 19 and the tool holder 3 is tilted. A tool 28 fixed to the tool holder 3 is brought into the angular position where standard 9 was previously located and the camera 13 is brought into its previously occupied position by a reverse controlled rotation of the stepping motor 19. The profile image 29 of tool 28 occupies (FIG. 5) a different position from that 27 of standard 9 and the measurement consists of the reference marking of the two distances D2 and D3 separating lines 25, 26 from the respective lines 25', 26' parallel thereto and tangential to the profile image of tool 29. These two distances D2 and D3 respectively correspond to offsets in the machining direction and the advance direction of the point of tool 28 relative to the point 12 of standard 9. As the gauges of standard 9 are known and cannot be misadjusted, because standard 9 is never dismantled, it is possible to deduce therefrom the position of tool 28 relative to tool holder 3, to chuck 2 and to the part to be machined.

It is possible to produce on screen 21 variable diameter mobile circles 30 brought onto the image of nose 31 of tool 28, in order to check its radius of curvature and therefrom the wear to tool 28.

Figure 4:
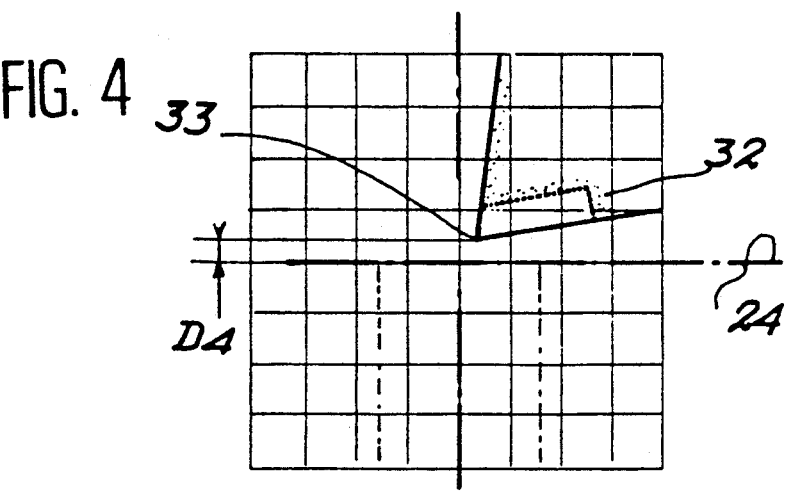
FIGS. 4, 5 and 6 indicate how a tool is gauged.
Figure 5:
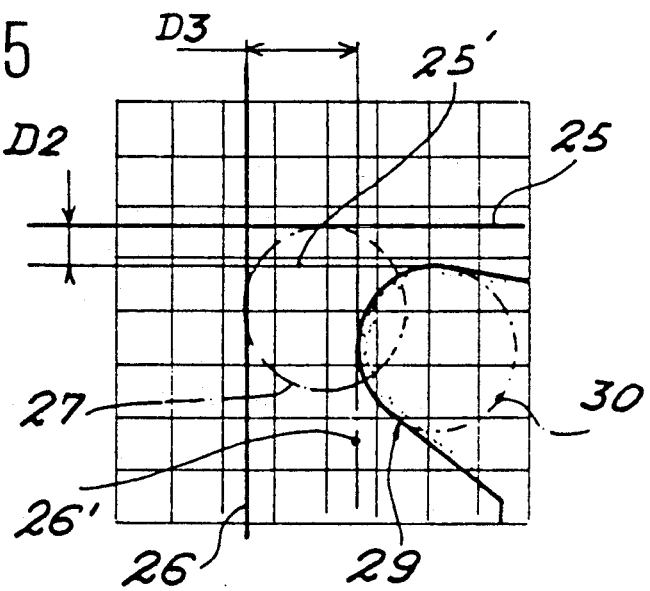

A 90° rotation is then imparted to camera 13 in order to obtain the front image 32 of tool 28, seen in the advance direction thereof (FIG. 4). The distance D4 from edge 33 to line 24 is measured either directly by using the square grid containing said line, or by measuring the distance between edge 33 and the edge of screen 21 and then comparing it with the distance D1. The centre height of tool 28 is deduced therefrom.

Figure 6:
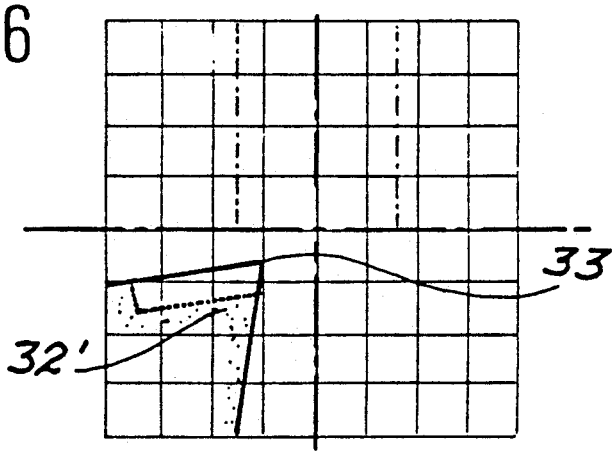

The third position of camera 13 is used when there is an internal turning tool 28', whose edge 33' is oriented in the opposite sense in advance direction X. The same measurements are carried out using camera 13 in the second and third positions to obtain in all cases an image 32' in which the edge 33' of the tool is in camera 13 (FIG. 6).

Camera 13 makes it possible to obtain measurements of tool gauges with uncertainties of approximately 5 μm. In addition, the measurements are very fast, because they can be partly automated and are directly usable for numerically controlled machine tools. Machining is then carried out, but the measurements can obviously be repeated between two passes for a same part if it is suspected that the tool is rapidly wearing.

We claim:

1. A system for measuring the position of at least one tool (28) on a machine tool (1), comprising: a structural assembly on the machine tool for carrying the tool, the structural assembly being movable so that the tool can be displaced along a machining direction (Z) and an advance direction (X), the tool and a standard (9) being secured at different places of a same carrying part (3, 4) of the structural assembly, the carrying part being movable relatively to other parts of the structural assembly by determined displacements so that the tool and the standard can be selectively brought into a zone; a camera secured to a rotary turret (17) and turnable about an axis (Z') in the machining direction so that the camera may selectively monitor said zone in the advance direction and a center height direction; and reference marking means (23) for comparing successive images of the tool and the standard obtained by the camera.

2. Position measuring system according to claim 1, and comprising a light source (35) for illuminating the standard (9) and nose (31) of said tool (28).

3. Position measuring system according to claim 1, wherein the camera support (14) is rotatable so that the camera can occupy two positions oppositely oriented in said advance direction.

4. Position measuring system according to claim 1, and comprising a screen (21) onto which are projected the tool images detected by said camera (13), the reference marking means consisting of a square grid (23) produced on the screen.

5. Position measuring system according to claim 4, wherein the square grid is movable.

6. Position measuring system according to claim 5, wherein the reference marking means also comprise movable circles (30) of various diameters on the screen.

7. Position measuring system according to claim 1, wherein the rotary turret is rotatable on a translatable support (14).

8. Position measuring system according to claim 1, wherein the carrying part is a rotating turret comprising holders for the standard and several tools, said determined displacement being fractions of a turn.

* * * * *